United States Patent Office 3,723,323
Patented Mar. 27, 1973

3,723,323
FABRIC TREATING SHAMPOO COMPOSITIONS
Lee W. Morgan, Racine, Wis., and Shrikrishna N. Desai, Bombay, India, assignors to S. C. Johnson & Son, Inc., Racine, Wis.
Filed Apr. 22, 1971, Ser. No. 136,434
Int. Cl. C11d 17/00; C08f 15/36
U.S. Cl. 252—90          10 Claims

ABSTRACT OF THE DISCLOSURE

Fabric treating shampoo compositions comprising a copolymer and at least one surface active agent, the weight ratio of said copolymer to said surface active agent being within the range of about 0.1:1 to about 1:1.

FIELD OF INVENTION

Figure 2:
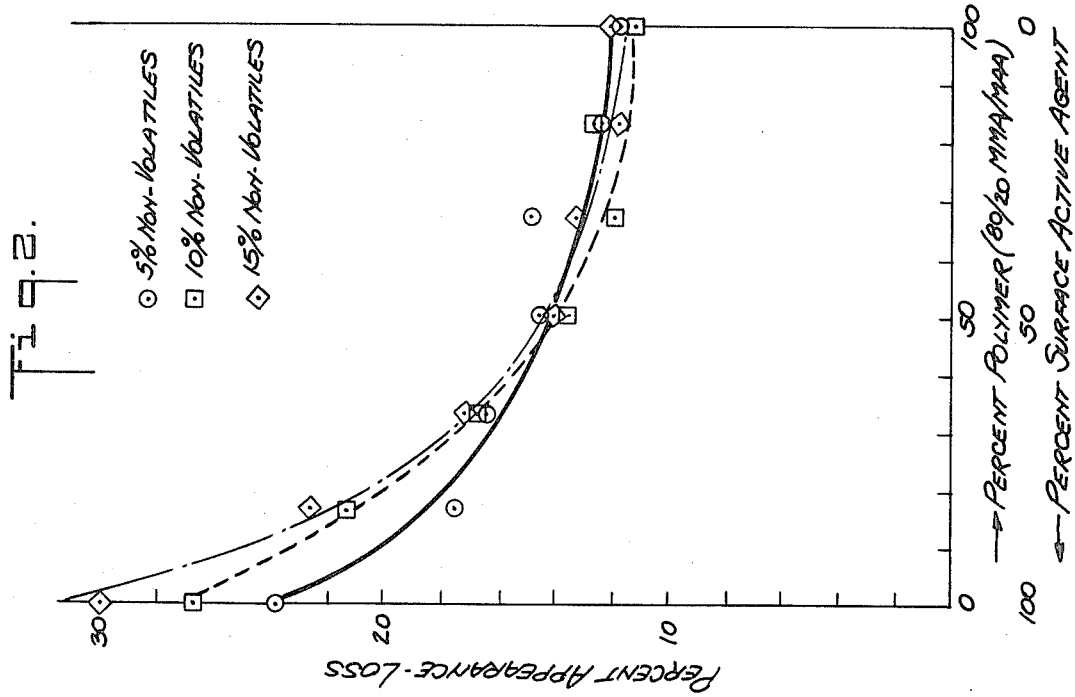
Figure 1:
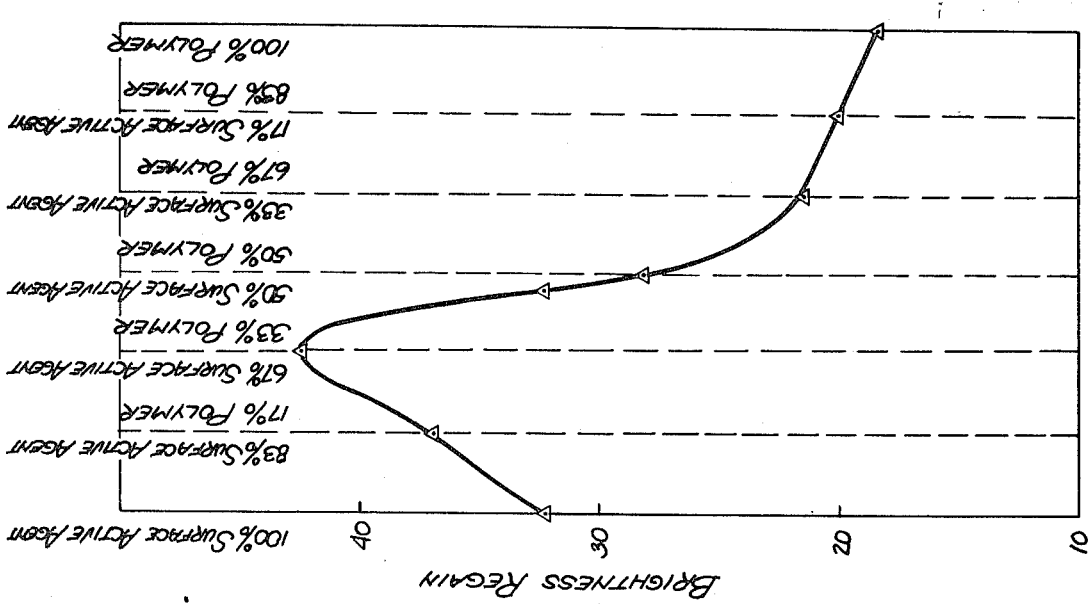

This invention relates to novel compositions for fabric treating. More specifically, this invention relates to fabric treating compositions comprising a copolymer and at least one surface active agent.

DESCRIPTION OF THE PRIOR ART

Shampoo compositions are generally known in the art and have been widely used for treating textile fabrics, particularly rugs and carpets. It is desirable in such compositions that they impart soil resistant properties to the treated surfaces. Many of the currently available shampoo compositions contain only surface active ingredients as the active components and thus rapid resoiling is common due to the oily or greasy nature of the residue left by these components. Even surface active agents which crystallize to a "dry" residue have a tendency to attract soil. Thus, these prior art compositions are frequently characterized by poor soil resistant properties resulting in rapid deterioration of the appearance of the treated textile fabrics and a necessity for frequent applications of the shampoo compositions.

SUMMARY OF THE INVENTION

It is, therefore, an object of the present invention to provide fabric treating shampoo compositions characterized by enhanced soil resistant properties and good cleaning ability.

Other objects of the present invention will be set forth in, or be apparent from the following detailed description of the invention.

These objects are achieved by the present invention which is directed toward novel fabric treating shampoo compositions comprising a copolymer, at least one surface active agent, preferably an anionic or nonionic synthetic detergent, and a liquid, preferably aqueous, diluent. Since the compositions contemplated by this invention will have widespread usage in the treating of pile fabrics, such as commonly found in rugs and carpeting, the present invention will be described with respect to these materials, though not limited thereto. The term "surface active agent" is used herein to denote a detergent compound, i.e., a substance that functions as a cleansing agent. Specific surface active agents which are useful in the present invention will be detailed hereinafter.

The copolymers of the present invention comprise a major proportion of at least one "hard" monomer and a minor proportion of at least one carboxylic acid-containing monomer. Hard monomers are those monomers whose homopolymers have a glass transition temperature, Tg, above about 65° C. Suitable hard monomers are the alkyl esters of methacrylic acid whose homopolymers typically have a glass transition temperature above about 65° C., such as methyl methacrylate (Tg typically 105° C.), ethyl methacrylate (Tg typically 65° C.), cyclohexyl methacrylate (Tg typically 66° C.) and isobornyl methacrylate (Tg typically 110–170° C.). The preferred hard monomer is methyl methacrylate.

The carboxylic acid-containing monomers are polymerizable monoethylenically unsaturated compounds having one carboxylic acid group such as acrylic acid and its -lower alkyl analogues such as methacrylic and ethacrylic acids. The preferred carboxylic acid-containing monomer is methacrylic acid.

The copolymers employed in the practice of the present invention will preferably have a glass transition temperature above about 65° C. and will preferably contain from about 2% to about 40% by weight of the carboxylic acid-containing monomer and from about 98% to about 60% by weight of the hard monomer. Small amounts of other compatible comonomers, such as styrene, ethyl acrylate, butyl acrylate, etc. can also be included, if desired. The polymers will generally have a molecular weight of from about 2,000 to about 500,000. When a high molecular weight polymer is utilized, i.e., a polymer of molecular weight above 100,000, the carboxylic acid-containing monomer should be from about 2% to about 15%. Greater amounts of the carboxylic acid-containing monomer may result in an increase in the viscosity of the polymer produced. It will be understood that the precise combination selected will depend upon the desired ultimate physical characteristics and the identity of the particular monomers employed. A high proportion of the carboxylic acid monomer generally produces a higher degree of water-solubility and water sensitivity. High proportions of the lower alkyl methacrylate monomer generally lead to more brittle, water-insensitive polymers. The most preferred polymers are those having a molecular weight of about 20,000 to about 400,000 and a composition of about 75% to 97% hard monomer and about 25% to 3% carboxylic acid monomer. The total polymer content in the present invention is from about 2% to about 8%, preferably from about 3% to about 5% by weight of a final shampoo composition.

The surface active agents which are particularly useful in the present invention are anionic and nonionic synthetic organic detergents. These detergents can be used alone or in combination with other anionic or nonionic detergents.

Examples of suitable anionic synthetic organic detergents are: alkyl glyceryl ether sulfonates; alkyl sulfonates; alkyl monoglyceride sulfates or sulfonates; alkyl polyethoxy ether sulfonates; alkyl aryl sulfonates; acyl sarcosinates; acyl esters of isethionates; alkyl esters of sulphosuccinic acid; and alkyl phenol polyethoxy sulfonates. In these compounds, the alkyl and the acyl groups, respectively, contain 10 to 20 carbon atoms. They are used in the form of water-soluble salts, for example, sodium, potassium and ammonium salts. Specific examples of the anionic organic detergents are sodium lauryl sulfate, sodium dodecyl sulfonate and sodium N-lauroyl sarcosinate.

Examples of suitable nonionic synthetic organic detergents are: polyethylene oxide condensates of alkyl phenols wherein the alkyl group contains from 6 to 12 carbon atoms and the ethylene oxide is present in a molar ratio of ethylene oxide to alkyl phenol in the range of 10:1 to 25:1; condensation products of ethylene oxide with the product resulting from the reaction of propylene oxide and ethylene diamine wherein the molecular weight of the condensation products ranges from 5,000 to 11,000; the condensation product of from about 5 to 30 moles of ethylene oxide with one mole of a branched or straight-chain aliphatic alcohol containing from 8 to 18 carbon atoms; trialkyl amine oxides and trialkyl phosphine oxides wherein one alkyl group ranges from 10 to 18 carbon atoms and two alkyl groups range from one to three carbon atoms.

It is preferable in order to achieve desirable solid resistant properties that the polymer be present in the amount of at least 10% of the polymer-surface active agent mixture. It is further preferable in order to achieve a desirable level of cleaning that the surface active agent be at least 50% of the polymer-surface active agent mixture. Thus the weight ratio of polymer to surface active agent should be within the range of 0.1 to 1 to 1:1. It will be understood, however, that the specific weight ratio of the polymer to surface active agent will depend upon the polymers and surface active agents selected as well as the desired ultimate physical characteristics of the composition.

The cleaning compositions can also contain various desired additives such as antistatic agents, optical brighteners, germicides, perfumes, deodorants, preservatives or the like. The balance of the composition will be made up of a liquid diluent, preferably water. The copolymer may be present as a dispersion or latex in the aqueous diluent or as a relatively clear solution, depending upon the pH of the composition and the molecular weight and composition of the polymer. Solubility of the polymer is enhanced by a pH above 7, low molecular weight and a high proportion of acid monomer in the polymer.

The compositions of the present invention are conveniently prepared by emulsion polymerization techniques. For example, the desired monomers in the proper ratio can be blended together and added over a period of about one hour to an aqueous system under an inert gas blanket containing the desired detergent or detergent mixture and a suitable free radical initiator. Polymerization is carried out at a temperature of from about 10° C. to about 100° C. for a period tof time sufficient to effect polymerization of substantialy all of the monomer present.

Suitable initiators include any of the known water-soluble free radical initiators including alkali metal persulfates; ammonium persulfate; hydrogen peroxide; and combinations thereof with suitable reducing agents such as sodium bisulfite. The initiators are generally used at from about 0.1% to about 2.0%, preferably about 0.5% to about 1.0% by weight of the total monomer charge.

It is usually preferable to also add a chain-transfer agent or chain-regulator in the polymerization reaction to produce a polymer having the desired molecular weight. Typical chain-transfer agents which can be used are long-chain mercaptans such as lauryl mercaptan: mercapto-acids such as β-mercaptopropionic acid and thioglycolic acid; allylic compounds; and halogenated hydrocarbons such as carbon tetrachloride, chloroform and bromotrichloromethane. The chain-trasfer agents are present at from about 0.2% to about 4.0%, preferably about 1.0% to about 2.0% by weight of the total monomer charge.

As desired, additional surface active agent can be added after polymerization is complete to form the fabric cleaning composition, or the full amount of surface active agent can be added prior to carrying out the polymerization. The polymer emulsion is then adjusted to the desired pH and solids level, and other additives can be included.

The fabric treating shampoo composition of the present invention is applied to the rug or carpet and is worked into the surface with a brush, sponge or the like. The treated fabric is then permitted to dry and upon drying, a substantially continuous film appears to form around the individual fibers. These films are relatively hard and brittle. Generally, the treated fabric will be brushed or vacuumed to remove the displaced soil and any loose residue from the composition. The treated fabric exhibits a high degree of resistance to resoiling which is characteristically different from fabrics treated with prior art compositions.

The fabric treating compositions of this invention may be packaged in any suitable container. They may be pressurized and made available in this form by means of the addition of a suitable propellant to the composition. Any propellant which can self-pressurize the composition and serve as the means for dispensing it from its container is suitable, including liquified gaseous propellants or inert compressed gases. The preferred propellants are liquified, normally gaseous propellants such as the known hydrocarbon and halogenated hydrocarbon propellants. The preferred normally gaseous hydrocarbon propellants include the aliphatic saturated hydrocarbons such as propane, butane, isobutane, and isopentane; the preferred halogenated hydrocarbons include chlorodifluoromethane, difluoroethane dichlorodifluoromethane and the like. Mixtures of two or more propellants can be used. The propellant is desirably utilized in an amount sufficient to expel the entire contents of the containers. In general, the propellant will be from about 5% to about 25%, preferably about 5% to about 15% by weight of the total composition. Pressurized forms of the compositions will generally be expelled from the container in the form of a thick, creamy foam. Non-pressurized compositions can be supplied as a concentrate to be diluted with water or as a fully constituted composition.

The following examples are given to illustrate embodiments of the invention as it is presently preferred to practice it. It will be understood that these examples are illustrative and the invention is not to be considered restricted thereo except as indicated in the appended claims.

EXAMPLE I

A copolymer suitable for use in a fabric treating composition is prepared as follows:

|  | G. |
|---|---|
| Methyl methacrylate (MMA) | 97 |
| Methacrylic acid (MAA) | 3 |
| Sodium lauryl sulfate | 3 |
| Ammonium persulfate | 0.5 |
| Water (distilled) | 300 |

Polymerization is carried out by heating the sodium lauryl sulfate in water to 80° C. under an inert gas blanket in a reactor equipped with a stirring mechanism. The ammonium persulfate is first added and then the blend of MMA and MAA is slowly added over a period of one hour. The reaction mixture is then maintained at reaction temperature for one hour and then cooled.

EXAMPLE II

A copolymer suitable for use in a fabric treating composition is prepared as follows:

|  | G. |
|---|---|
| Methyl methacrylate (MMA) | 80 |
| Methacrylic acid (MAA) | 20 |
| Bromotrichloromethane (BTCM) | 2 |
| Ammonium persulfate | 1 |
| Sodium lauryl sulfate | 3 |
| Water (distilled) | 300 |

The sodium lauryl sulfate and water are heated to a temperature of 82° C. under an inert gas blanket in a reactor equipped with a stirring mechanism. The ammonium persulfate is first added and then the blend of MMA, MAA and BTCM is slowly added over a period of one hour. The reaction mixture is then maintained at the reaction temperature for an additional hour and then cooled.

EXAMPLE III

Fabric treating compositions are prepared as follows:

|  | A | B |
|---|---|---|
| Sodium lauryl sulfate, g | 10.0 | 6.67 |
| Sodium N-lauroyl sarcosinate, g | 5.0 | 3.33 |
| Copolymer of methyl methacrylate/methacrylic acid (80/20) prepared as in Example II, g | | 5.0 |
| Water, g | 85.0 | 85.0 |
| Ammonia | (1) | (1) |
| Percent non-volatiles | 15.0 | 15.0 |

[1] Sufficient amount to adjust the pH to 9.0.

Each of the compositions is tested for soil resistant properties, or "appearance loss," as follows: Two identical white, short pile nylon carpet pieces which are in their originally manufactured condition are utilized. Appearance readings are taken before cleaning with a Hunter Laboratory Reflectometer (H.L. #1). The pieces of carpet are then cleaned, one with composition A and the other with composition B and conditioned 24 hours at room temperature and 80% relative humidity. The pieces of carpet are then artificially soiled and vacuumed and readings are again taken on the Hunter Laboratory Reflectometer (H.L. #2). The percent appearance loss, a measure of the soil resistant property, is calculated as follows:

$$\text{percent appearance loss} = \frac{\text{H.L. \#1} - \text{H.L. \#2}}{\text{H.L. \#1}} \times 100$$

The smaller the appearance loss the less soil retained by the carpet. The results of the test are shown in Table I.

Each of the compositions is tested for cleaning ability, or "brightness regain," as follows. Two pieces of identical carpet are commercially washed and a Hunter Laboratory Reflectometer reading is taken (H.L. #3). The pieces of carpet are soiled naturally or artificially and then vacuumed and a Hunter Laboratory Reflectometer reading taken (H.L. #4).

The pieces of carpet are then cleaned with compositions A and B, respectively, and permitted to dry. The pieces of carpet are then vacuumed again and a final Hunter Laboratory Reflectometer reading is taken (H.L. #5). The percent brightness regain, a measure of cleaning ability, is calculated as follows:

$$\text{percent brightness regain} = \frac{\text{H.L. \#5} - \text{H.L. \#4}}{\text{H.L. \#3} - \text{H.L. \#4}} \times 100$$

The results of this test are also shown in Table I.

TABLE I

| Test | Composition, percent | |
|---|---|---|
|  | A | B |
| Appearance loss | 30.0 | 17.0 |
| Brightness regain | 32.7 | 42.9 |

It is evident from the data of Table I that composition B is a more effective fabric treating composition than composition A since composition B shows considerably enhanced resistance to resoiling and greater cleaning ability.

EXAMPLE IV

A cleaning study is performed in order to determine the ratio of polymer to surface active agent which is desirable to achieve good cleaning results. Various ratios of polymer to surface active agent are prepared and the "brightness regain" for these mixtures is measured in accordance with the procedures of Example III. The polymer used is the copolymer of methyl methacrylate/methacrylic acid (80/20) prepared as in Example II. The surface active agent used is a mixture of sodium lauryl sulfate and sodium N-lauroyl sarcosinate in a 2:1 ratio, respectively. The percent nonvolatiles represent the amount of solids present in the compositions. The results obtained are shown in Table II and FIG. 2.

TABLE II

| Composition | Percent non-volatiles | Ratio[1] | Percent brightness regain |
|---|---|---|---|
| 1 | 15.0 | (2) | 33.5 |
| 2 | 15.0 | 0.2:1 | 37 |
| 3 | 15.0 | 0.5:1 | 43 |
| 4 | 15.0 | 1:1 | 28.5 |
| 5 | 15.0 | 2:1 | 22 |
| 6 | 15.0 | 5:1 | 21 |
| 7 | 15.0 | (3) | 18.5 |

[1] Ratio of polymer to surface active agent.
[2] 100% surfactant, no polymer.
[3] 100% polymer, no surfactant.

A percent brightness regain of at least about 30 is considered very good. In the above series it is found that compositions having a polymer to surfactant ratio of 1:1 or less give outstanding cleaning. Optimum cleaning is found with compositions having a ratio between about 0.2:1 and 0.7:1.

A study of soil resistant properties is performed in order to determine the ratio of polymer to surface active agent which is desirable to achieve good soil resistant properties. The same polymer and surface active agent mixture as in the cleaning test are utilized and various ratios are prepared and tested for appearance loss in accordance with the procedures of Example III. The results are shown in Table III and FIG. 2 for 5% non-volatile, 10% non-volatile and 15% non-volatile concentrations.

TABLE III

| Composition | Percent non-volatiles | Ratio[1] | Percent appearance loss |
|---|---|---|---|
| 1 | 5 | (2) | 23.9 |
| 2 | 10 | (2) | 26.8 |
| 3 | 15 | (2) | 30.0 |
| 4 | 5 | 0.2:1 | 17.6 |
| 5 | 10 | 0.2:1 | 21.2 |
| 6 | 15 | 0.2:1 | 22.6 |
| 7 | 5 | 0.5:1 | 16.4 |
| 8 | 10 | 0.5:1 | 16.8 |
| 9 | 15 | 0.5:1 | 17.2 |
| 10 | 5 | 1:1 | 14.4 |
| 11 | 10 | 1:1 | 13.6 |
| 12 | 15 | 1:1 | 14.0 |
| 13 | 5 | 2:1 | 14.8 |
| 14 | 10 | 2:1 | 11.8 |
| 15 | 15 | 2:1 | 13.2 |
| 16 | 5 | 5:1 | 12.2 |
| 17 | 10 | 5:1 | 12.6 |
| 18 | 15 | 5:1 | 11.6 |
| 19 | 5 | (3) | 11.8 |
| 20 | 10 | (3) | 11.2 |
| 21 | 15 | (3) | 12.0 |

[1] Ratio of polymer to surface active agent.
[2] 100% surfactant, no polymer.
[3] 100% polymer, no surfactant.

A percent appearance loss of less than 20 is considered indicative of very good soil resistant properties. Thus, it can be seen from the data shown in FIG. 2 that a polymer:surfactant ratio of at least about 0.2:1 results in good resistance to resoiling. Ratios of about 2:1 give optimum resoiling resistance, but there is only a very small additional improvement in resoiling resistance when the ratio is raised above about 1:1.

Taking into account a desired balance between the two essential properties of cleaning ability and resistance to resoiling, the ratio of polymer to surfactant in the compositions of the invention will be between about 0.1:1 and 1:1 and most preferably between about 0.2:1 and 0.7:1.

EXAMPLE V

A pressurized fabric treating shampoo composition is prepared as follows:

|  | G. |
|---|---|
| Sodium lauryl sulfate | 3.00 |
| Sodium N-lauroyl sarcosinate | 2.00 |
| Copolymers of methyl methacrylate/methacrylic acid (80/20) prepared as in Example II | 3.00 |
| Propellant (83% iso-butane, 17% propane) | 7.5 |
| Water | 90.50 |
| Ammonia | (1) |

[1] Sufficient amount to adjust the pH to 8.0.

The ingredients are combined in a sealed aerosol can filled with a foam dispensing valve and head. The composition is released from the container as a foam which is readily worked into a pile fabric. Fabrics treated with the composition are effectively cleaned and rendered resistant to resoiling for prolonged periods.

What is claimed is:

1. A fabric treating composition comprising an aqueous dispersion of at least one surface active agent selected from the group consisting of anionic and nonionic detergents and a copolymer of from about 98 to about 60%, by weight, of at least one alkyl methacrylate whose homopolymer has a glass transition temperature of at least 65° C. and from about 2 to about 40%, by weight, of at least one ethylenically unsaturated carboxylic acid selected from the group consisting of acrylic acid and methacrylic acid, the weight ratio of said copolymer to said surface active agent being within the range of about 0.1:1 to about 1:1, said copolymer having a glass transition temperature above about 65° C. and a molecular weight of from about 2,000 to about 500,000.

2. The composition of claim 1, wherein the copolymer comprises methyl methacrylate and methacrylic acid.

3. The composition of claim 1, wherein the copolymer comprises from about 98% to about 60% methyl methacrylate and about 2% to about 40% methacrylic acid.

4. The composition of claim 1, wherein the surface active agent comprises sodium lauryl sulfate.

5. The composition of claim 1, wherein the surface active agent comprises a mixture of sodium lauryl sulfate and sodium N-lauroyl sarcosinate.

6. A fabric treating composition comprising an aqueous dispersion of at least one surface active agent selected from the group consisting of anionic and nonionic detergents; a copolymer of from about 98 to about 60%, by weight, of at least one alkyl methacrylate whose homopolymer has a glass transition temperature of at least 65° C. and from about 2 to about 40%, by weight, of at least one ethylenically unsaturated carboxylic acid selected from the group consisting of acrylic acid and methacrylic acid and at least one propellant, the ratio of said copolymer to said surface active agent being within the range of about 0.2 to about 0.7:1, said copolymer having a glass transition temperature above about 65° C. and a molecular weight of from about 2,000 to about 500,000.

7. The composition of claim 6, wherein the propellant is a liquified, normally gaseous hydrocarbon or halogenated hydrocarbon propellant.

8. The composition of claim 6, wherein the polymer comprises methyl methacrylate and methacrylic acid.

9. The composition of claim 6 wherein the surface active agent comprises sodium lauryl sulfate.

10. The composition of claim 6, wherein the surface active agent comprises a mixture of sodium lauryl sulfate and sodium N-lauroyl sarcosinate.

References Cited
UNITED STATES PATENTS

| | | | |
|---|---|---|---|
| 3,563,905 | 2/1971 | Schmade et al. | 252—89 |
| 3,630,934 | 12/1971 | Kelly et al. | 252—89 |
| 2,879,231 | 3/1959 | Allen et al. | 252—90 |

FOREIGN PATENTS

| | | | |
|---|---|---|---|
| 842,672 | 7/1960 | United Kingdom | 252—DIG 2 |

OTHER REFERENCES

Fordyce et al.: "Built Nonionic Liquid Detergents," Soap and Chemical Specialties, April 1962, pp. 59–62; March 1962, pp. 57–60 and 105.

WILLIAM D. MARTIN, Primary Examiner

D. COHEN, Assistant Examiner

U.S. Cl. X.R.

252—89, DIG 2; 260—29.6 R